United States Patent [19] | [11] 3,714,354
Stam | [45] Jan. 30, 1973

[54] BRONCHODILATOR ACTIVITY OF SUBSTITUTED QUINAZOLINECARBOXYLIC ACID ESTERS

[75] Inventor: John G. Stam, New York, N.Y.

[73] Assignee: Pfizer Inc., New York, N.Y.

[22] Filed: July 6, 1971

[21] Appl. No.: 160,089

[52] U.S. Cl. ............................424/251, 260/251 QA
[51] Int. Cl. ............................................A61k 27/00
[58] Field of Search .................424/251; 260/251 QA

[56] References Cited

UNITED STATES PATENTS 3,092,631 6/1963 Song et al. ............................260/251
3,304,304 2/1967 Claassen et al. .......................424/251
3,631,042 12/1971 Vincent et al. .......................424/251

OTHER PUBLICATIONS

Chemical Abstracts 69:36066q (1968)
Chemical Abstracts 68:12949h (1968)

*Primary Examiner*—Albert T. Meyers
*Assistant Examiner*—Norman A. Drezin
*Attorney*—Arthur G. Connolly et al.

[57] ABSTRACT

The process of producing bronchial dilation which comprises administering to a subject an effective amount of a substituted quinazolinecarboxylic acid ester.

2 Claims, No Drawings

BRONCHODILATOR ACTIVITY OF SUBSTITUTED QUINAZOLINECARBOXYLIC ACID ESTERS

BACKGROUND OF THE INVENTION

This invention relates to the field of treatment of respiratory ailments by the action of smooth muscle relaxing agents. In particular, it relates to the use of substituted quinazolinecarboxylic acid esters to produce bronchial dilatation.

Treatment of subjects suffering from bronchoconstriction, which may either be functional or caused by allergenic or asthmatic conditions or result from microbial infection, requires that the therapeutic agent effectively cause bronchodilatation at dosage levels which do not cause other undesirable effects in the subject. The compounds of this invention manifest bronchodiliatory activity at dosage levels at which no substantial adverse effects are produced at the treated individuals, and thus are effective in the symptomatic treatment of asthma and other respiratory disorders such as chronic bronchitis and emphysema.

The substituted quinazolinecarboxylic acid esters of this invention are known as potent analgesic and tranquilizing agents, but their efficacy in producing bronchial dilatation is novel and unexpected.

SUMMARY OF THE INVENTION

The present invention comprises a process for producing bronchial dilatation by administering to a subject an effective amount of a compound of the formula:

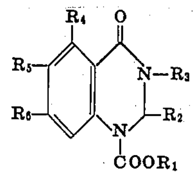

I wherein:

$R_1$, $R_2$, and $R_3$ are each alkyl of one to three carbon atoms.

$R_4$ is hydrogen or chloro.

$R_5$ and $R_6$ are each hydrogen or alkoxy of one to three carbon atoms. The preferred embodiment of this invention is 3,4-dihydro-6,7-dimethoxy-2,3-dimethyl-4-oxo-1(2H)-quinazolinecarboxylic acid, ethyl ester.

DETAILED DESCRIPTION OF THE INVENTION

The compounds of the invention are preferably prepared by first selectively reducing with a metal hydride a substituted quinazolin-4-one compound of the formula:

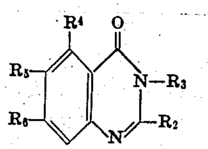

II at a temperature of about 0° C. to yield a compound of the formula:

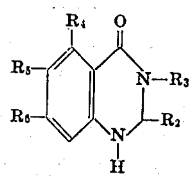

III

Alternatively, the quinazolin-4-one compound can be reduced in the form of the acid addition salt, preferably the hydrochloric acid addition salt. Preferably, metal hydrides are $LiBH_4$, $LiAlH_4$, and $NaBH_4$.

The the reduced quinazolin-4-one compound or its acid addition salt is reacted at a temperature of about 10°–25 C. with a compound of the formula $$ClCOOR_1, FLOOR_1, ICOOR_1, \text{or } BrCOOR_1;$$

or is reacted at a temperature of about 10°–50° C. with a compound of the formula $COOR_1OR_1$ and a base to form the desired compounds I. The base to be used with $COOR_1OR_1$ can be typically an alkali metal hydride, hydroxide, and oxide.

The substituted quinazolin-4-one starting compounds II can be conveniently prepared by first reacting a 4,5-dimethoxy anthranilic ester (IV) with an N,N-disubstituted amide (V) (wherein $R_7$ and $R_8$ are each alkyl) in the presence of either $POCl_3$, $SOCl_2$, or $COCl_2$ at a temperature between −10° and 30° C.

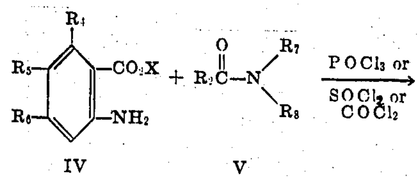

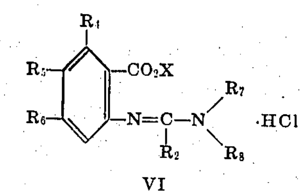

The resulting product (VI) is then reacted with a primary amine in a reaction inert solvent such as ethanol or water, at a temperature of about 0° to 100° C. to yield the desired substituted quinazolin-4-one starting compound II.

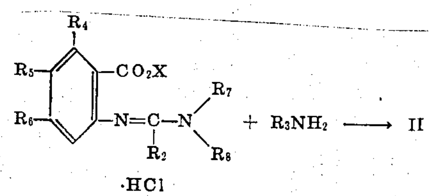

All substituents are as previously defined.

The starting materials necessary for the above reaction methods leading to the desired compounds are either all known compounds or else they can easily be prepared by those skilled in the art in accordance with standard organic procedures.

All of the compounds useful in the process of this invention may be prepared in the above manner.

For the evaluation of the usefulness of substituted quinazolinecarboxylic acid esters of this invention as agents for producing bronchial dilatation, the known smooth muscle relaxant and bronchial dilator theophylline was used as the standard for comparison. The two drugs were dissolved in water and administered orally to conscious guinea pigs by gavage. One hour after drug administration each animal was exposed to an aerosol of histamine hydrochloride. The respiratory status was evaluated at the end of 1 minute.

The compounds of the present invention exhibit activity comparable to and even greater than the well known drug theophylline in this guinea pig test. Accordingly, it can be reasonably expected that they will be effective in man.

The compounds of this invention will preferably be administered orally in the form of tablets or capsules, using suitable excipients, or as aqueous suspensions using suitable diluents and emulsifying or suspending agents as desired. Other dosage forms for parenteral or inhalation therapy are also acceptable.

The dosages used will, of course, vary with the age and conditions of the patient and will best be determined by the physician. A general dosage range of from about 0.20 to 7 mg. drug per kg. body weight given three times a day would be typical although higher or lower dosages may be preferred for individual cases.

The following examples are illustrative and in no way limit the scope of the appended claims.

PREPARATION A 6,7-Dimethoxy-2,3-dimethyl-4(3H)-quinazolinone (11.7 g., 50 mmoles) is converted to the hydrochloride salt in ether with dry HCl. The salt is filtered and suspended in 150 ml. of diglyme under $N_2$. After cooling the suspension to 0°, $NaBH_4$ (2.8 g., 75 mmoles) is added in portions and the mixture stirred at room temperature for 1 hour. Water is added to hydrolyze the excess $NaBH_4$ and the mixture is evaporated to dryness under reduced pressure. The residue is partitioned between $CH_2Cl_2$ and $H_2O$, the $CH_2Cl_2$ layer is dried using $MgSO_4$, and the solvent evaporated. Trituration of the residual yellow oil yields a colorless, crystalline product, 10.9 g., m.p. 92°–95°. Recrystallization from benzene provides (A), 2,3-Dihydro-6,7-dimethoxy-2,3-dimethyl-4(1H)-quinazolinone, which contains a fraction of mole of benzene: m.p. 95°–97°; ir (KBr) 2.95, 3.10 (NH), 6.14 $\mu$ (C=O); nmr ($CHCl_3$) $\delta$ 1.4 (*d*, J = 6, 3H, C—$CH_3$), 3.0 (s, 3H, $NCH_3$), 3.8 (two *s*, 6H, $OCH_3$), 4.8 (*q*, J = 6, 1H, CH), 5.0 (broad *s*, 1H, exchanges with $D_2O$), NH), 6.2 (*s*, 1H, H-8), 7.35 (*s*, 2H, solvent), 7.4 (*s*, 1H, H-5).

Anal. Clac'd for $C_{12}H_{16}N_2O_3 \cdot 1/3\ C_6H_6$: C, 64.10; H, 6.92; N, 10.68.

Found: C, 63.52; H, 6.89; N, 10.95.

A solution of (A) (5.75 g., 25 mmoles) in 50 ml. of $CH_2Cl_2$ was cooled to 0°. Anhydrous $K_2CO_3$ (17.4 g., 125 mmoles) was added, followed by careful addition of ethyl chloroformate (2.98 g., 28 mmoles) in 25 ml. of $CH_2Cl_2$. Reaction temperature was maintained below 10° During the addition, then the mixture was stirred at room temperature for 20 hours. Water was added and the organic phase washed with $H_2O$, 1N aqueous HCl, and $H_2O$. Evaporation of the solvent yielded a yellow oil which was chromatographed on silica gel (elution with ethyl acetate). The final two fractions afford a colorless oil, which was crystallized from a mixture of $Et_2O$-pet. ether to provide 3,4-dihydro-6,7-dimethoxy-2,3-dimethyl-4-oxo-1(2H)-quinazolinecarboxylic acid, ethyl ester: m.p. 70°–74°; ir (KBr) 5.79 (carbamate C=O), 6.04 $\mu$ (amide C=O); nmr ($CDCl_3$) $\delta$ 1.3 (*t*, J = 7, 3H, ester $CH_3$) 1.3 (*d*, J = 7, 3H, 2-$CH_3$), 3.1 (*s*, 3H, N—$CH_3$), 3.9 (*s*, 6H, $OCH_3$), 4.3 (*q*, J = 7, 2H, ester $CH_2$), 5.9 (*q*, J = 7, 1H, H-2), 7.2 (*s*, 1H, H-8), 7.5 (*s*, 1H, H-5).

Anal. Calc'd for $C_{15}H_{20}N_2O_5$: C, 58.44; H, 6.54; N, 9.09.

Found: C, 58.10; H, 6.76; N, 9.10.

PREPARATION B

Preparation of 5- Chloro-2,3-dimethyl-4-(3H)quinazolinone

To 52 ml. of cold (0°) dimethylacetamide and 11.9 g. (64 mmoles) methyl 5-chloroanthranilate was added 15.7 g. (102 mmoles) phosphorus oxychloride dropwise in 20 minutes with the temperature rising to 7°. The resulting slurry was stirred for 2 hours at 0°–5°, and then 130 ml. of 40 percent methylamine solution was added while maintaining the temperature below 60°. The reaction was stirred overnight and then poured onto 500 ml. water. The aqueous solution was extracted with six 150 ml. portions of methylene chloride. The combined extracts were washed with water, dried over magnesium sulfate, and concentrated at reduced pressure (50°10.05 mm) to give 17.2 g. pale yellow oil. There was obtained 20 g. of the hydrochloride salt by dissolution of 16.2 g. oil in ethyl ether/methylene chloride and bubbling hydrogen chloride into the solution: m.p. 160°–161°.

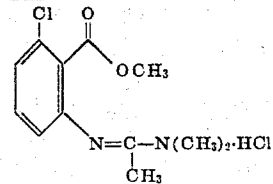

Anal. Calc'd for $C_{12}H_{15} \cdot HCl$: C, 49.50; H, 5.54; N, 9.62.

Found: C, 49.53; H, 5.28; N, 10.33.

A solution of 18.5 g. of the above salt, 100 ml. of dimethylacetamide, and 130 ml. of 40 percent methylamine solution were heated at reflux overnight. The reaction was diluted with 300 ml. water, and extracted six times with 100 ml. portions of methylene chloride. The combined extracts were washed with water, dried over magnesium sulfate, and concentrated at reduced pressure (50° / 0.05 mm) to give 10.29 g. yellow solid. Recrystallization from methyl alcohol gave 6.17 g. white needles: m.p. 143°–144°.

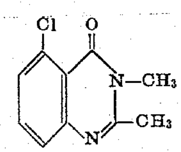

Anal. Calc'd for $C_{10}H_9ClN_2O$: C, 57.57; H, 4.35; N, 13.43.

Found: C, 57.56; H, 4.36; N, 13.41.

Preparation of 5-Chloro-2,3-dihydro-2,3-dimethyl-4(1H)quinazolinone

To a stirred suspension of 5.0 g. (24 mmoles) 5-chloro-2,3-dimethyl-4(3H)quinazolinone and 2.27 g. (60 mmoles) sodium borohydride under nitrogen at 0° was added 1.72 ml. of acetic acid (30 mmoles) in 10 ml. tetrahydrofuran in 15 minutes. The resulting yellow solution was stirred for 4 hours at 10°–15°, and then poured onto 200 g. ice and 200 ml. methylene chloride. The methyl chloride layer was separated and the aqueous was extracted with five 100 ml. portions of methylene chloride. The combined extracts were washed with water, dried over magnesium sulfate and concentrated at reduced pressure to give a white solid. The solid recrystallized from benzene gave 4.87 g. white needles: m.p. 139°–141°.

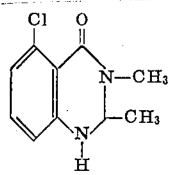

Anal. Calc'd for $C_{10}H_{11}ClN_2O$: C, 57.02; H, 5.26; N, 13.30.

Found: C, 56.89; H, 5.28; N, 13.39.

Preparation of 5-Chloro-3,4-dihydro-2,3-dimethyl-4-oxo-1(2H)quinazoline carboxylic acid, ethyl ester A solution of 3.0 g. (14.2 mmoles) of the above quinazolinone, 1.4 g. (28.6 mmoles) sodium hydride, and 70 ml. degassed diethylcarbonate under nitrogen was stirred for 6 hours. The light brown mixture was poured onto 200 ml. ice and 200 ml. methylene chloride. The methylene chloride layer was separated, and the aqueous layer was extracted with four additional 100 ml. portions of methylene chloride. The combined extracts were washed with saturated sodium chloride solution, dried over magnesium sulfate, and concentrated at reduced pressure to give a light brown oil. The oil was placed on a silica gel column and eluted with hexane/ethyl acetate (1:1) to give 2.80 g. colorless oil which crystallized upon standing. The solid recrystallized from cyclohexane gave 2.15 g. white prisms: m.p. 92°–94.

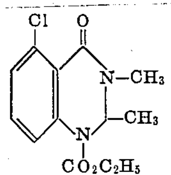

Anal. Calc'd for $C_{13}H_{15}ClN_2O_3$: C, 55.23; H, 5.35; N, 9.91.

Found, C, 55.19; H, 5.40; N, 9.88.

The other compounds of the invention useful as bronchodilators are prepared in the like manner.

EXAMPLE I

The known bronchodilator theophylline and 3,4-dihydro-6,7-dimethoxy-2,3-dimethyl-4-ox-1(2H)-quinazolinecarboxylic acid, ethyl ester, were compared side by side in a histamine aerosol test. The drugs were dissolved in water and administered orally to conscious guinea pigs by gavage. One hour after drug administration each animal was exposed to an aerosol of histamine hydrochloride, 2 mg/ml, for 1 minute and her respiratory status evaluated at the end of the minute in relation to an arbitrary scale with values 0–4. Eight female Reed-Willett guinea pigs, 200–260 g., were used for each level of drug tested. The sum of scores for each group of eight was expressed as percent protection in relation to the score obtained with a group dosed with only water. The results are tabulated below.

| Dose, mg/kg p.o. | Percent Protection vs Histamine Aerosol Test Compound | Thephylline |
|---|---|---|
| 30 | 29 | |
| 60 | 35 | 16 |
| 90 | 42 | 32 |
| 120 | | 26 |

EXAMPLE II–VI

The following compounds were tested by the procedures of Example I at 60 mg. and the following results were obtained:

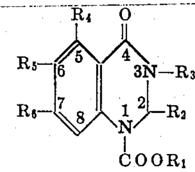

| Ex. No. | $R_1$ | $R_2$ | $R_3$ | $R_4$ | $R_5$ | $R_6$ | Protection, percent |
|---|---|---|---|---|---|---|---|
| II | $C_2H_5$ | $CH_3$ | $CH_3$ | Cl | H | H | 19 |
| III | $C_2H_5$ | $CH_3$ | $CH_3$ | H | H | $CH_3O$ | 37 |
| IV | $C_2H_5$ | $CH_3$ | $C_2H_5$ | H | $CH_3O$ | $CH_3O$ | 31 |
| V | $C_2H_5$ | $C_3H_7$ | $CH_3$ | H | $CH_3O$ | $CH_3O$ | 9 |
| VI | $CH_3$ | $CH_3$ | $CH_3$ | H | $CH_3O$ | $CH_3O$ | 6 |

What is claimed is:

1. The process of producing bronchial dilatation which comprises administering to a subject suffering from bronchoconstriction an effective amount of a compound of the formula:

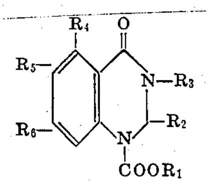

wherein:

$R_1$, $R_2$, and $R_3$ are each alkyl of one to three carbon atoms.

$R_4$ is hydrogen or chloro.

$R_5$ and $R_6$ are each hydrogen or alkoxy of one to three carbon atoms.

2. The process of claim 1 wherein said compound is 3,4-dihydro-6,7-dimethoxy-2,3-dimethyl-4-oxo-1(2H)-quinazolinecarboxylic acid, ethyl ester.

* * * * *